(12) United States Patent
Vaidya et al.

(10) Patent No.: US 11,583,794 B2
(45) Date of Patent: Feb. 21, 2023

(54) FILTRATION MONITORING SYSTEM DATA TRANSMISSION

(71) Applicant: Cummins Filtration IP, Inc., Columbus, IN (US)

(72) Inventors: Abhijeet Vaidya, Columbus, IN (US); Erica C. Clark-Heinrich, Cookeville, TN (US); Amit Dhingra, McFarland, WI (US); Bharadwaj R. Prabhala, Columbus, IN (US)

(73) Assignee: Cummins Filtration IP, Inc., Columbus, IN (US)

( * ) Notice: Subject to any disclaimer, the term of this patent is extended or adjusted under 35 U.S.C. 154(b) by 742 days.

(21) Appl. No.: 16/487,940

(22) PCT Filed: Feb. 22, 2018

(86) PCT No.: PCT/US2018/019145
§ 371 (c)(1),
(2) Date: Aug. 22, 2019

(87) PCT Pub. No.: WO2018/156709
PCT Pub. Date: Aug. 30, 2018

(65) Prior Publication Data
US 2019/0374889 A1 Dec. 12, 2019

Related U.S. Application Data

(60) Provisional application No. 62/463,155, filed on Feb. 24, 2017.

(51) Int. Cl.
*B01D 37/04* (2006.01)
*B01D 35/143* (2006.01)
(Continued)

(52) U.S. Cl.
CPC ........... *B01D 37/04* (2013.01); *B01D 35/143* (2013.01); *G05D 1/0088* (2013.01); *G06F 5/06* (2013.01);
(Continued)

(58) Field of Classification Search
CPC .. B01D 37/04; B01D 35/143; B01D 2201/56; G05D 1/0088; G05D 2201/0213; G06F 5/06
(Continued)

(56) References Cited

U.S. PATENT DOCUMENTS 6,687,587 B2   2/2004   Kacel
7,991,525 B2   8/2011   Pryor et al.
(Continued)

FOREIGN PATENT DOCUMENTS

CN   201821458 U   5/2011
CN   102685233 A   9/2012
(Continued)

OTHER PUBLICATIONS

Foreign Action other than Search Report on CN 2018800131131 dated Mar. 1, 2021.
(Continued)

*Primary Examiner* — Tuan C To
(74) *Attorney, Agent, or Firm* — Foley & Lardner LLP

(57) ABSTRACT

Data relating to the status of a vehicle, an internal combustion engine powering the vehicle, and various filtration systems that provide filtered fluid to the vehicle and/or internal combustion engine is generated or gathered by an engine control module and a filtration monitoring system. The engine control module and the filtration monitoring system provide the data to a telematics system for transmitting the data to a remote data center (e.g., a cloud computing system, a remote diagnostics system, a maintenance system,
(Continued)

etc.). Depending on an availability of a cellular data connection, the data is either sent directly to the remote data center via a network, or indirectly by first transmitting the data over a local connection to an operator device (e.g., a smartphone), which then sends the data to the remote data center once a connection to the network is available.

20 Claims, 3 Drawing Sheets

(51) Int. Cl.
  *G06F 5/06* (2006.01)
  *G05D 1/00* (2006.01)
(52) U.S. Cl.
  CPC . *B01D 2201/56* (2013.01); *G05D 2201/0213* (2013.01)
(58) Field of Classification Search
  USPC .......................................................... 702/182
  See application file for complete search history.

(56) References Cited

U.S. PATENT DOCUMENTS

| | | | |
|---|---|---|---|
| 8,055,403 B2 | 11/2011 | Lowrey et al. | |
| 8,121,628 B2 | 2/2012 | Mauti, Jr. | |
| 8,457,686 B2 | 6/2013 | Przybylski | |
| 8,526,930 B2 | 9/2013 | Watkins et al. | |
| 8,527,135 B2 | 9/2013 | Lowrey et al. | |
| 8,626,152 B2 | 1/2014 | Farrell et al. | |
| 8,635,091 B2 | 1/2014 | Amigo et al. | |
| 8,660,549 B2 | 2/2014 | Hrabak et al. | |
| 8,666,464 B2 | 3/2014 | Frye et al. | |
| 8,731,627 B2 | 5/2014 | Inabathuni et al. | |
| 8,761,758 B2 | 6/2014 | Farrell et al. | |
| 8,768,345 B2 | 7/2014 | Farrell et al. | |
| 8,774,794 B2 | 7/2014 | Farrell et al. | |
| 8,798,587 B2 | 8/2014 | Snider | |
| 8,798,616 B2 | 8/2014 | Farrell et al. | |
| 8,818,358 B2 | 8/2014 | Farrell et al. | |
| 8,825,124 B1 | 9/2014 | Davies et al. | |
| 8,892,090 B2 | 11/2014 | Gee et al. | |
| 9,021,049 B2 | 4/2015 | Bai et al. | |
| 9,070,168 B2 | 6/2015 | Amigo et al. | |
| 9,084,118 B2 | 7/2015 | Oesterling | |
| 9,113,288 B2 | 8/2015 | Sauerbrey et al. | |
| 9,161,189 B2 | 10/2015 | Lorello et al. | |
| 9,193,232 B2 | 11/2015 | Huntzicker | |
| 9,208,623 B2 | 12/2015 | Baumert et al. | |
| 9,224,249 B2 | 12/2015 | Lowrey et al. | |
| 9,229,903 B2 | 1/2016 | Swanson et al. | |
| 9,241,236 B2 | 1/2016 | Wisse | |
| 9,326,115 B2 | 4/2016 | Kobayashi | |
| 9,338,731 B2 | 5/2016 | Cepuran et al. | |
| 9,406,176 B2 | 8/2016 | Hansen et al. | |
| 9,408,043 B2 | 8/2016 | Mannikka | |
| 9,939,820 B2* | 4/2018 | Apostolides | F01M 11/04 |
| 2007/0086579 A1 | 4/2007 | Lorello et al. | |
| 2009/0063174 A1 | 3/2009 | Fricke | |
| 2009/0170537 A1* | 7/2009 | Mauti, Jr. | H04L 67/325 455/466 |
| 2009/0197593 A1 | 8/2009 | Farrell et al. | |
| 2010/0033372 A1 | 2/2010 | Pryor et al. | |
| 2010/0093273 A1 | 4/2010 | Hohl | |
| 2010/0248695 A1 | 9/2010 | Cepuran | |
| 2011/0088374 A1* | 4/2011 | Johnson | F01N 3/023 60/285 |
| 2011/0143668 A1 | 6/2011 | Farrell et al. | |
| 2011/0143669 A1 | 6/2011 | Farrell et al. | |
| 2011/0143670 A1 | 6/2011 | Farrell et al. | |
| 2011/0143750 A1 | 6/2011 | Farrell et al. | |
| 2011/0143751 A1 | 6/2011 | Farrell et al. | |
| 2011/0153367 A1 | 6/2011 | Amigo et al. | |
| 2012/0041618 A1 | 2/2012 | Sun et al. | |
| 2012/0142367 A1 | 6/2012 | Przybylski | |
| 2012/0252364 A1 | 10/2012 | Inabathuni et al. | |
| 2013/0103282 A1* | 4/2013 | Oh | B60W 10/06 701/84 |
| 2013/0220900 A1 | 8/2013 | Milvert et al. | |
| 2013/0252680 A1 | 9/2013 | Frye et al. | |
| 2013/0288659 A1 | 10/2013 | Hrabak et al. | |
| 2013/0327729 A1* | 12/2013 | Apostolides | F17D 1/14 210/97 |
| 2014/0005880 A1 | 1/2014 | Guenkova-Luy et al. | |
| 2014/0051425 A1 | 2/2014 | Ahearn et al. | |
| 2014/0067152 A1 | 3/2014 | Swanson et al. | |
| 2014/0114696 A1 | 4/2014 | Amigo et al. | |
| 2014/0199989 A1 | 7/2014 | Cepuran et al. | |
| 2014/0248861 A1 | 9/2014 | Farrell et al. | |
| 2014/0248918 A1 | 9/2014 | Yarnold et al. | |
| 2014/0256258 A1 | 9/2014 | Deluca | |
| 2014/0273955 A1 | 9/2014 | Oesterling | |
| 2014/0324248 A1* | 10/2014 | Huntzicker | B60D 1/24 701/1 |
| 2014/0324275 A1* | 10/2014 | Stanek | G07C 5/008 701/31.4 |
| 2015/0024688 A1 | 1/2015 | Hrabak et al. | |
| 2015/0128215 A1 | 5/2015 | Son et al. | |
| 2015/0170427 A1 | 6/2015 | Hansen et al. | |
| 2015/0201297 A1 | 7/2015 | Sauerbrey et al. | |
| 2015/0269791 A1 | 9/2015 | Amigo et al. | |
| 2015/0341757 A1 | 11/2015 | Mannikka | |
| 2015/0349977 A1 | 12/2015 | Risse et al. | |
| 2015/0382165 A1 | 12/2015 | Lorello et al. | |
| 2016/0067639 A1 | 3/2016 | Shimpi et al. | |
| 2016/0135028 A1 | 5/2016 | Choi | |
| 2016/0174051 A1 | 6/2016 | Yae | |
| 2016/0201533 A1* | 7/2016 | Upadhyay | F01N 9/002 60/274 |
| 2016/0217635 A1 | 7/2016 | Pudar et al. | |
| 2016/0219059 A1 | 7/2016 | Park | |
| 2016/0273471 A1 | 9/2016 | Shimpi et al. | |
| 2016/0342456 A1 | 11/2016 | McQuade et al. | |
| 2017/0011561 A1* | 1/2017 | Makke | F02D 41/22 |
| 2017/0038775 A1 | 2/2017 | Park | |
| 2017/0063994 A1* | 3/2017 | Lei | G06F 3/0482 |
| 2017/0173505 A1* | 6/2017 | Dhingra | G01N 15/08 |
| 2017/0298881 A1* | 10/2017 | Malgorn | B01D 36/005 |
| 2017/0366521 A1* | 12/2017 | Lei | H04W 4/40 |
| 2018/0128621 A1* | 5/2018 | Kwon | G01S 13/723 |

FOREIGN PATENT DOCUMENTS

| | | | |
|---|---|---|---|
| CN | 104106082 A | 10/2014 | |
| CN | 105120976 A | 12/2015 | |
| DE | 102014109880 A1 * | 1/2015 | .......... B60L 15/2018 |
| DE | 102016100150 A1 * | 7/2016 | .......... F01N 3/0232 |
| WO | WO-02/19053 A2 | 3/2002 | |
| WO | WO-2004/110093 A1 | 12/2004 | |
| WO | WO-2005/109372 A1 | 11/2005 | |
| WO | WO-2007/047505 A2 | 4/2007 | |
| WO | WO-2008/132549 A2 | 11/2008 | |
| WO | WO-2012/042509 A1 | 4/2012 | |
| WO | WO-2012/121482 A2 | 9/2012 | |
| WO | WO-2012-128497 A2 | 9/2012 | |
| WO | WO-2013/052641 A2 | 4/2013 | |
| WO | WO-2013/058415 A1 | 4/2013 | |
| WO | WO-2013/066999 A1 | 5/2013 | |
| WO | WO-2013/101169 A1 | 7/2013 | |
| WO | WO-2013/117082 A1 | 8/2013 | |
| WO | WO-2013/117545 A1 | 8/2013 | |
| WO | WO-2013/153429 A1 | 10/2013 | |
| WO | WO-2013/174078 A1 | 11/2013 | |
| WO | WO-2013/175674 A1 | 11/2013 | |
| WO | WO-2013/191332 A1 | 12/2013 | |
| WO | WO-2014/084707 A1 | 6/2014 | |
| WO | WO-2014/159174 A1 | 10/2014 | |
| WO | WO-2015/081895 A1 | 6/2015 | |
| WO | WO-2015/134644 A1 | 9/2015 | |
| WO | WO-2015/136029 A2 | 9/2015 | |
| WO | WO-2015/149678 A1 | 10/2015 | |

(56) References Cited

FOREIGN PATENT DOCUMENTS

| WO | WO-2015/163503 A1 | 10/2015 |
| WO | WO-2015/165254 A1 | 11/2015 |
| WO | WO-2016/007548 A1 | 1/2016 |
| WO | WO-2016/054835 A1 | 4/2016 |
| WO | WO-2016/074533 A1 | 5/2016 |

OTHER PUBLICATIONS

International Search Report & Written Opinion for PCT/US2018/019145 dated May 4, 2018, 13 pages.

* cited by examiner

FILTRATION MONITORING SYSTEM DATA TRANSMISSION

CROSS REFERENCE TO RELATED APPLICATIONS

This application is a national stage of PCT Application No. PCT/US2018/019145, filed Feb. 22, 2018 which claims priority to U.S. Provisional Patent Application No. 62/463,155, filed on Feb. 24, 2017. The contents of both applications are incorporated herein by reference in their entirety.

TECHNICAL FIELD

The present application relates to filtration or fluid quality monitoring systems.

BACKGROUND

Internal combustion engines generally combust a mixture of fuel (e.g., gasoline, diesel, natural gas, etc.) and air. Prior to entering the engine, fluids such as fuel, oil, and air are typically passed through filtration systems having filter cartridges having filter media, which remove contaminants (e.g., particulates, dust, water, etc.) from the fluids prior to delivery to the internal combustion engine. The filter cartridges and some fluids require periodic replacement as the filter media of the filter cartridges captures and removes the contaminants from the fluids passing through the filter media or the fluid degrades. However, the lifespan and replacement times for each filter cartridge or fluid may be different. Additionally, the lifespan and replacement times for each filter cartridge or fluid may be affected by filter cartridge type, filter cartridge manufacturer, engine type, engine operating parameters, and environmental conditions. Accordingly, some internal combustion engines utilize a filtration monitoring system (FMS) that monitors various sensor feedback, environmental conditions, and engine operating parameters to determine when a given filtration system requires servicing (i.e., when a given filter element requires replacement or a fluid needs replacement).

The information from the FMS may be reported back to an external device (e.g., to a remote data center). However, many internal combustion engines are used to power vehicles that can move in and out of range of a communication network (e.g., when the vehicle is at a remote site, such as a mine, that is not covered by a cellular network). Accordingly, the data from the FMS may not be able to be transmitted if the vehicle is not in range of the communication network.

SUMMARY

Various example embodiments relate to a telematics system for a vehicle and methods of operating the smart telematics system. One such embodiment relates to a method. The method includes receiving, by a telematics system, data from a filtration monitoring system module. The filtration monitoring system module is configured to monitor a characteristic of at least one filtration system associated with an internal combustion engine. The data relates to the monitored characteristic. The method further includes determining, by the telematics system, a status of a cellular data connection between the telematics system and a network. The method includes transmitting, by the telematics system and based on the determined status of the cellular connection, the received data either to a remote data center via the network and the cellular data connection or to an operator device associated with an operator of the internal combustion engine via a local wireless connection established between the telematics system and the operator device. In some arrangements, the data is stored, by the telematics system, in a memory device of the telematics system. In some arrangements, the method further comprises receiving, by the telematics system a confirmation message from the remote data center or the operator device that the data was received. In some arrangements, the method further comprises deleting, by the telematics system, the data from the memory device.

Another such embodiment, relates to a telematics system. The telematics system comprises a filtration monitoring system (FMS) input-output circuit and a data transmission circuit. The FMS input-output circuit is structured to send and receive first data to and from an FMS module structured to monitor a characteristic of a filtration system associated with an internal combustion engine. The first data comprises information relating to the monitored characteristic. The data transmission circuit is structured to determine a status of a cellular data connection to a network as active or not active. The data transmission circuit is structured to transmit second data comprising information relating to the monitored characteristic to a remote data center via the cellular data connection to the network when the status of the cellular data connection to the network is active. The data transmission circuit is structured to transmit the second data comprising information relating to the monitored characteristic to an operator device associated with an operator of the internal combustion engine via a local wireless connection established between the telematics system and the operator device when the status of the cellular data connection to the network is not active. In some arrangements, the telematics system further comprises an engine control module (ECM) input-output circuit structured to send and receive data to and from an ECM module. The ECM module is structured to provide data relating to an engine operating parameter and the second data further comprises the data relating to the engine operating parameter. In some arrangements, the telematics system further comprises a data transceiver structured to establish the local wireless connection between the telematics system and the operator device and send the second data comprising information relating to the monitored characteristic to the operator device associated with the operator to the internal combustion engine via the established local wireless connection. In some arrangements, the telematics system further comprises a memory device structured to store the first data. In some arrangements, the data transmission circuit is further structured to receive a confirmation message from the remote data center or the operator device that the second data was received. In some arrangements, the memory device is further structured to delete the first data from the memory device consequent to transmission of the second data. In some arrangements, the memory device is further structured to delete the first data from the memory device consequent to receiving the confirmation message from the remote data center or the operator device.

Another such embodiment relates to a method. The method comprises receiving, by one of an engine control module (ECM) or filtration monitoring system (FMS), data from a filtration monitoring system module. The filtration monitoring system module is configured to monitor a characteristic of at least one filtration system associated with an internal combustion engine. The data is related to the monitored characteristic. The method further comprises determining, by a telematics system, a status of a cellular data connection between the telematics system and a network is inactive, transmitting data comprising the inactive status of the cellular data connection to the one of the ECM or FMS by the telematics system, and transmitting, by the one of the ECM or FMS, the received data, based on the determined status of the cellular connection, to an operator device associated with an operator of the internal combustion engine via a local wireless connection established between the one of the ECM or FMS and the operator device.

In some arrangements, the memory device comprises a first-in first-out buffer. In some arrangements, the local wireless connection is a Bluetooth connection between the telematics system and the operator device. In some arrangements, the operator device is a smartphone. In some arrangements, the data, the first data, or the second data includes a timestamp that corresponds to a time in which the monitored characteristic was sensed.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, systems and methods for transmitting data gathered by a filter monitoring system (FMS) to a remote data center are described. Data relating to the status of a vehicle, an internal combustion engine powering the vehicle, filtered fluids, and various filtration systems that provide the filtered fluids to the vehicle and/or internal combustion engine is generated or gathered by an engine control module and a filtration monitoring system. In some implementations, a system (e.g., an FMS) monitors fluids including filtered fluids to provide an indication of overall filtration system performance instead of or in addition to additional filter system status monitoring. The engine control module and the filtration monitoring system provide the data to a telematics system for transmitting the data to a remote data center (e.g., a cloud computing system, a remote diagnostics system, a maintenance system, etc.). Depending on whether the telematics system has a stable cellular data connection, the data is either sent directly to the remote data center via a network (e.g., the internet), or indirectly by first transmitting the data over a local connection to an operator device (e.g., a smartphone associated with a driver of the vehicle, a device associated with operator or technician associated with an autonomous vehicle, etc.), which then sends the data to the remote data center once a connection to the network is available.

Figure 1:
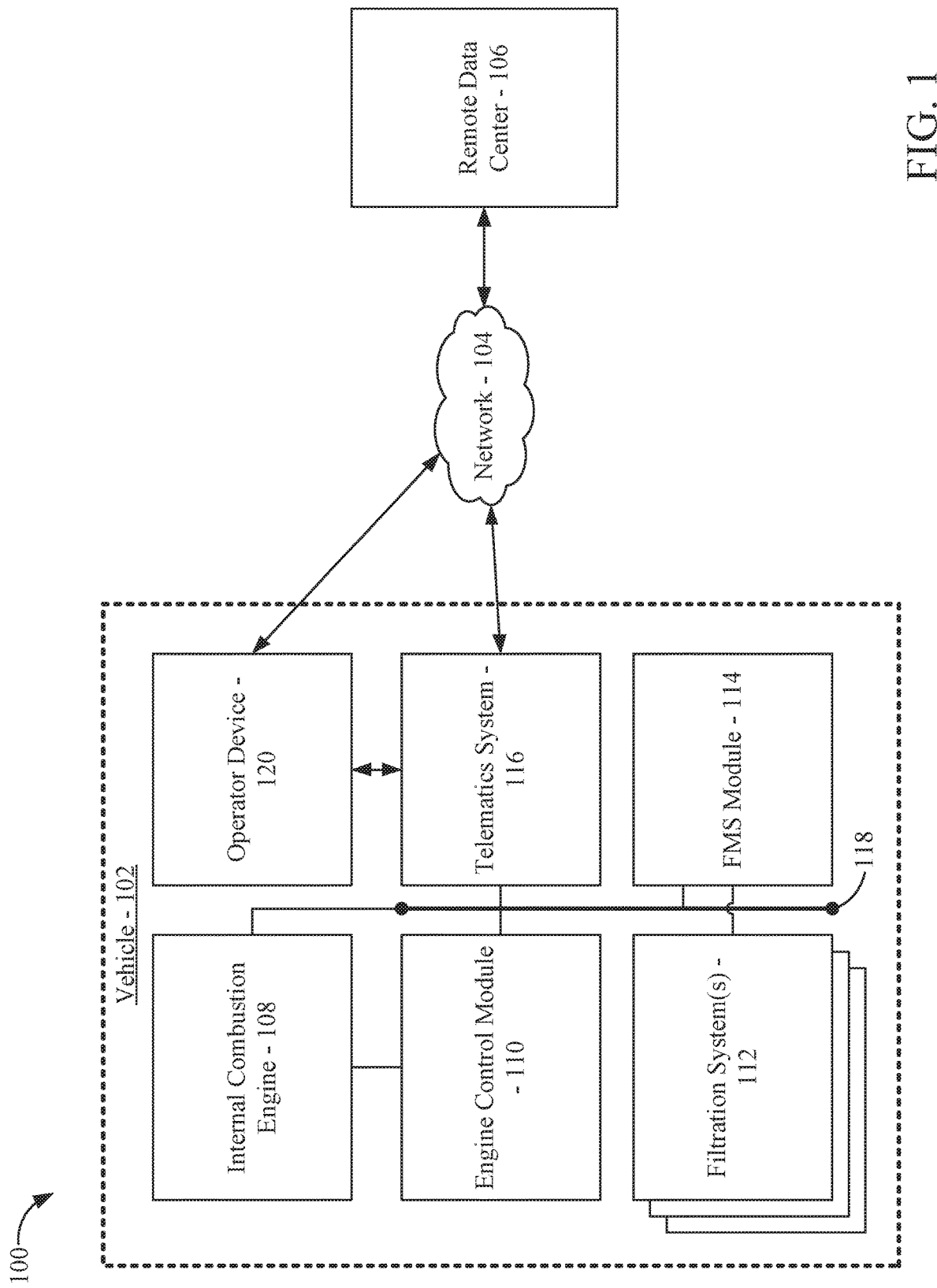
FIG. 1 shows a schematic view of a system according to an example embodiment.

Referring to FIG. 1, a schematic view of a system 100 is shown according to an example embodiment. The system 100 generally includes a vehicle 102, a communication network 104, and a remote data center 106. The vehicle 102 may be, for example, an automobile, a truck, a recreational vehicle, a piece of construction equipment, a train engine, or any other vehicle 102. The vehicle is powered at least in part by an internal combustion engine 108 (e.g., a diesel internal combustion engine). The operation of the internal combustion engine 108 is controlled by an engine control module 110. During operation of the internal combustion engine 108, the internal combustion engine 108 consumes and/or uses various liquids, such as air, fuel, oil, and the like. Prior to entering the internal combustion engine 108, the fluids are passed through various filtration systems 112. Some of the filtration systems 112 include filter cartridges, which remove contaminants (e.g., particulates, dust, water, etc.) from the fluids prior to delivery to the internal combustion engine 108 (e.g., an air filtration system having an air filter cartridge, a fuel filtration system having a fuel filter cartridge, a lubricant filtration system having a lubricant filter cartridge, etc.).

The various filtration systems 112 of associated with the vehicle 102 are monitored by a filter monitoring system (FMS) module 114. For example, the FMS module 114 may receive data from sensors associated with the various filtration systems 112 (e.g., pressure sensors, pressure differential sensors, temperature sensors, viscosity sensors, fluid characteristic/condition sensors, etc.), internal combustion engine 108 operating parameters from the engine control module 110 (e.g., engine type, engine speed, engine temperature, etc.), environmental conditions (e.g., vehicle location from a GPS system, ambient temperature, on/off road status, etc.), and the like to determine when a filter element or fluids of one of the filtration systems 112 requires replacement or service. The data may be tagged with a time stamp based on when the data was gathered to help build a time-correct timeline of data (as described below). Example filter monitoring systems are described in U.S. patent application Ser. No. 15/029,442, entitled "ELECTRONIC FILTER DETECTION FEATURE FOR LIQUID FILTRATION SYSTEMS," filed on Oct. 16, 2014, U.S. patent application Ser. No. 14/977,858, entitled "FILTRATION MONITORING SYSTEMS," filed on Dec. 22, 2015, U.S. Provisional Patent Application No. 62/320,030, entitled "SYSTEM AND METHOD FOR CALCULATING REMAINING USEFUL LIFE AND CURRENT FILTER STATUS FOR FUEL AND LUBE FILTERS," filed on Apr. 8, 2016, and U.S. Provisional Patent Application No. 62/357,067, entitled "SYSTEM AND METHOD FOR OUTPUTTING FILTER MONITORING SYSTEM INFORMATION VIA TELEMATICS," filed on Jun. 30, 2016, each of which are herein incorporated by reference in their entireties and for all purposes.

The vehicle 102 includes a telematics system 116. The telematics system 116 is structured to receive data from the engine control module 110 (e.g., engine operating parameters, environmental conditions, etc.) and the FMS module 114 (e.g., remaining useful filter cartridge life, fluid status, etc.) and to transmit the received data either directly or indirectly to the remote data center 106. In some arrangements, the telematics system 116, the FMS module 114, and the engine control module 110 communicate over a wired connection facilitated by a vehicle bus 118. In some arrangements, the vehicle bus 118 utilizes the Society of Automotive Engineers standard SAE J1939 data protocol. In some arrangements, the telematics system 116 is integrated with the FMS module 114 or the engine control module 110. In further arrangements, the telematics system 116, the FMS module 114, and the engine control module 110 are integrated into a single controller.

As described in further detail below with respect to FIGS. 2 and 3, the telematics system 116 can transmit data to the remote data center 106 either directly via the network 104 or indirectly by first transmitting the data to an operator device 120 (e.g., a smartphone associated with a driver of the vehicle, a device associated with an operator or technician of an autonomous vehicle), which then transmits the data to the remote data center 106 via the network 104. For example, when the telematics system 116 is connected to the network 104 via a cellular network connection, the telematics system 116 transmits the data directly to the remote data center 106. Although shown as being within the vehicle 102, it should be understood that the operator device 120 does not need to be within the vehicle 102 (e.g., in arrangements where the vehicle is an autonomous vehicle and does not have a driver sitting within a cabin of the vehicle). However, when the telematics system 116 is not connected to the network 104 via the cellular network connection (e.g., if the vehicle drives out of range of the cellular network connection), the telematics system 116 may transmit the data to the operator device 120 over a short-range wireless data connection (e.g., Bluetooth, ZigBee, Wi-Fi, etc.), which will then transmit the data to the remote data center 106 via a cellular or Wi-Fi connection established by the operator device 120. In some arrangements, the telematics system is structured to inform the FMS or ECM of lost communication, and the FMS or ECM transmit the short-range communication to the operator device 120, wherein the FMS or ECM comprise the short-range data transceiver. In some arrangements, such an intermediate data transmission prevents potential data loss due to automatic deletion by the telematics system 116 or the FMS module 114 because the operator device 120 has a larger quantity of internal memory to store the data for longer periods of time (i.e., to store the data until data transmission is possible). The network 104 may include any combination of wired or wireless networks. In some arrangements, the network 104 includes the internet. Upon receipt of the data, the remote data center 106 can build a database from the multiple data streams (e.g., from data received from the operator device 120 and from the data received from the telematics system 116) to be in sequential order based on timestamps associated with each data piece. Accordingly, if there are gaps in the data received from the telematics system 116 (e.g., no data for a certain time period), and if that data is later received from the operator device 120, the remote data center 106 can insert the data received from the operator device 120 into the database at the correct time period to build a time-correct sequential database.

Figure 2:
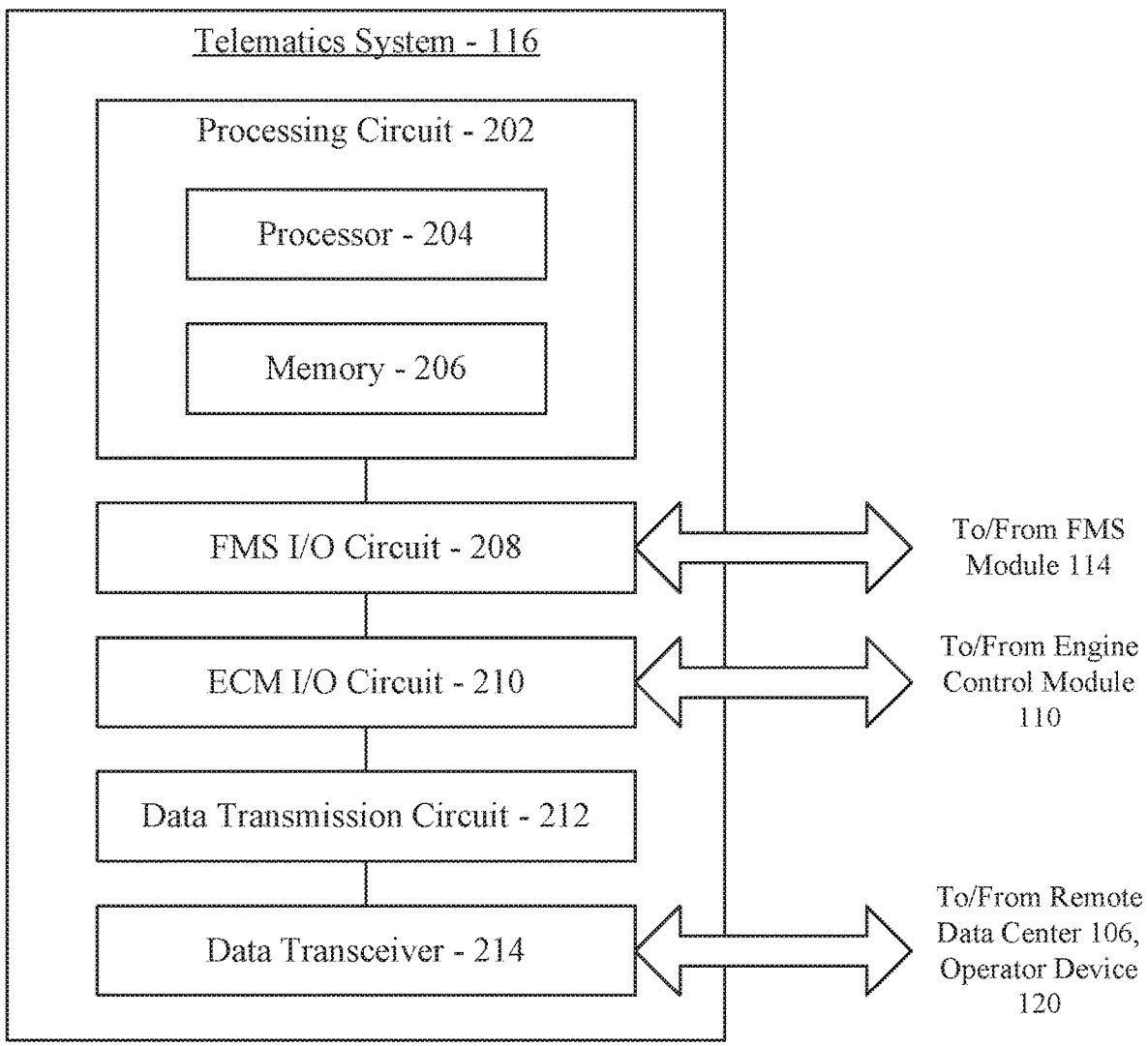
FIG. 2 shows a block diagram of a telematics system of the system of FIG. 1.

Referring to FIG. 2, a block diagram of the telematics system 116 is shown. The telematics system 116 includes a processing circuit 202. The processing circuit 202 includes a processor 204 and memory 206. The processor 204 may be a general-purpose processor, an application specific integrated circuit (ASIC), a programmable logic controller (PLC) ship, one or more field programmable gate arrays (FPGAs), a digital signal processor (DSP), a group of processing components, or other suitable electronic processing components. The memory 206 may include any of RAM, NVRAM, ROM, Flash Memory, hard disk storage, or the like. The processor 204 is structured to execute instructions stored in the memory 206 that cause the processor 204 to control the operation of the telematics system 116. In some arrangements, the memory 206 may also include one or more storage devices (e.g., hard drives, flash drives, computer readable media, etc.) either local or remote from the filter monitoring controller 124. The memory 206 can be configured to store look up tables, algorithms or instructions. Such algorithms can include, for example, data filtering, temperature conditioning and correcting, numerical methods, decision making algorithms which processes a certain number of successive input data to calculate the desired output. In some arrangements, the memory 206 includes a first-in first-out buffer. In such arrangements, the telematics system 116 does not have the ability to store data received from the FMS module 114 and/or from the engine control module 110 for an extended period of time (e.g., for longer than a minute, for longer than ten minutes, for longer than an hour, etc.).

The telematics system 116 includes a FMS circuit 208 (also referred to as a FMS input-output (or I/O) circuit), an ECM circuit 210 (also referred to as an ECM input-output (or I/O) circuit), a data transmission circuit 212, and a data transceiver 214 (also referred to as an operator input-output (or I/O) circuit). In some arrangements, each of the FMS circuit 208, the ECM circuit 210, and the data transmission circuit 212 are separate from the processing circuit 202 (e.g., as shown in FIG. 2). In other arrangements, the processing circuit 202 includes any or all of the FMS circuit 208, the ECM circuit 210, and the data transmission circuit 212.

The FMS circuit 208 is structured to receive and send data to and from the FMS module 114. The data may relate to, for example, remaining useful life of any of the filter cartridges installed in the filtration systems 112, percent loading of any of the filter cartridges installed in the filtration systems 112, detected fluid characterizes of fluid being filtered through any of the filtration systems 112 (e.g., pressure, temperature, chemical properties, contaminant information, etc.), operator warnings, and the like. The telematics system 116 stores the received data in the memory 206 for transmission to the remote data center 106. As described above with respect to the memory 206, the memory 206 may have a limited storage capacity, which requires periodic transmission and deletion of the received data. Accordingly, if received data is not transmitted out of the telematics system 116 (i.e., to the remote data center 106 or to the operator device 120), the data may be permanently lost. In arrangements where the telematics system 116 is part of the FMS module 114, the FMS circuit 208 may be structured to monitor the filtration systems 112 as described above. In some arrangements, the FMS circuit is incorporated into the ECM circuit to perform the combined functionality.

The ECM circuit 210 is structured to communicate information to and from the engine control module 110. Accordingly, through the ECM circuit 210, the internal combustion engine 108 can provide a real-time feedback signal relating to engine operating parameters (e.g., speed, temperature, oil pressure, lubricant pump speed, lubricant pump power draw, fuel pump speed, fuel pump power draw, fuel consumption, etc.) to the telematics system 116 via the engine control module 110. Additionally, via the ECM circuit 210, the telematics system 116 can send messages to the engine control module 110 (e.g., to trigger a dashboard warning, to trigger an alarm, to shut off the internal combustion engine 108, to derate the internal combustion engine 108, etc.). In arrangements where the telematics system 116 is part of the engine control module 110, the ECM circuit 210 may be structured control the operation of the internal combustion engine 108.

The data transceiver/operator input-output circuit 214 is structured to send information (e.g., real-time feedback of engine operating parameters, filtration system status, filter element change indicators, etc.) to the operator device 120. Additionally, the data transceiver 214 is structured to receive information from the operator device 120. The information may relate to engine on/off situations (e.g., for "key-on" situations or similar situations involving turning on and off the internal combustion engine 108), service information (e.g., filter element change information, fluid information, service reset commands, etc.), and the like. The data transceiver 214 may comprise a transceiver (wired or wireless) configured to transmit data to external devices (e.g., the operator device 120, a remote telematics system, a vehicle dashboard, etc.). For example, the telematics system 116 can light up an indication lamp (e.g., a dashboard light) via the data transceiver 214.

The data transmission circuit 212 is structured to determine when and how to send data received from the FMS module 114 and/or the engine control module 110 to the remote data center 106. The data transmission circuit 212 analyzes feedback from the data transceiver 214 to determine whether to send the data directly to the remote data center 106 (e.g., via an active cellular data connection over the network 104, if available) or indirectly by first sending the data to the operator device 120 (e.g., via a short-range wireless data connection, such as Bluetooth, ZigBee, Wi-Fi, etc.). The specific operation of the data transmission circuit 212 is described in further detail below with respect to FIG. 3.

Still referring to FIG. 2, the data transceiver 214 is structured to facilitate at least two different data connections: a long range wireless data connection with the network 104, and a short range wireless data connection directly with the operator device 120. The long range wireless data connection may be, for example, a cellular data connection (e.g., with the network 104 such that the telematics system 116 can transmit data to and from the remote data center 106 over the network 104. Accordingly, the data transceiver 214 may include a cellular data transceiver. The short range wireless data connection is a direct wireless connection established between the telematics system 116 and the operator device 120. In some arrangements, data transmitted between the telematics system 116 and the operator device does not need to pass through the network 104. In some arrangements, the short range wireless data connection is a Bluetooth data connection established between the telematics system 116 and the operator device 120. In such arrangements, the data transceiver 214 includes a Bluetooth transceiver. In other arrangements, the short range wireless data connection may be facilitated over a different wireless networking protocol, such as ZigBee, Wi-Fi, or the like. In such arrangements, the data transceiver 214 includes a transceiver structured to communicate with the operator device 120 over the designated data communication protocol. Although shown as including a single data transceiver 214 that facilitates both the short range wireless data connection and the long range wireless data connection, it should be understood that the data transceiver 214 may be comprised of separate data transceivers: at least one to facilitate the long range wireless data connection and at least one other transceiver to facilitate the short range wireless data connection.

Figure 3:
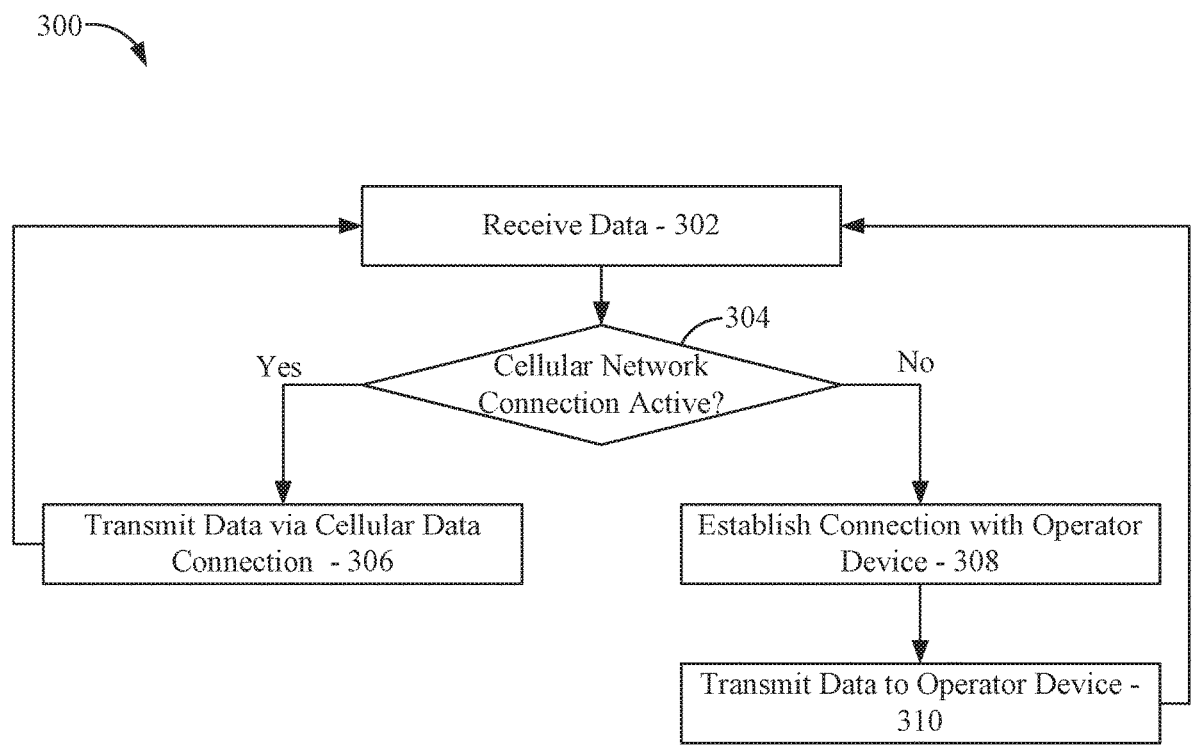
FIG. 3 shows a flow diagram of a method of transmitting data via a telematics system according to an example embodiment.

Referring to FIG. 3, a flow diagram of a method 300 of transmitting data via the telematics system 116 is shown according to an example embodiment. The method 300 is performed by the telematics system 116. In arrangements where the telematics system 116 is part of the FMS module 114 or the engine control module 110, the method 300 is performed by the FMS module 114 or the engine control module 110. Generally, the method 300 describes the decisioning process of the telematics system 116 in sending received data (e.g., data received from the FMS module 114 and/or from the engine control module 110) either directly to the remote data center 106 (e.g., via a cellular data connection) or indirectly to the remote data center 106 via the operator device 120 (e.g., by first transmission of the data to the operator device 120, which then stores and later relays the data to the remote data center 106).

The method 300 begins when data is received at 302. The telematics system 116 receives data from the FMS module 114 and/or from the engine control module 110 via the FMS circuit 208 and the ECM circuit 210. The data may be received as a real-time data stream or as periodic data packets. The data may relate to real-time operating parameters of the internal combustion engine 108, diagnostic information relating to the internal combustion engine 108, filter cartridge status (e.g., percent loading, genuine/non-authorized filter cartridge installed, filter cartridge identifier, filter cartridge change warnings), or other information relating to the operation of the vehicle 102. In some arrangements, the data is stored in the memory 206. For example, the data may be stored in a first-in first-out buffer until the data is transmitted (as described in further detail below).

The telematics system 116 determines whether a cellular data connection is active at 304. The telematics system 116, via the data transmission circuit 212, checks the status of the data transceiver 214 to determine if the telematics system 116 is connected to the network 104. In some arrangements, the telematics system 116 analyzes a connection strength to determine whether the connection is stable and strong enough to reliably transmit data over the connection. The cellular data connection may be, for example, may utilize a GSM protocol, a CDMA protocol, an LTE protocol, or the like.

If a cellular data connection is active, the data is transmitted via the cellular data connection at 306. The telematics system 116, via the data transmission circuit 212 and the data transceiver 214, transmits the data directly to the remote data center 106 through the network 104. In some arrangements, the data is deleted from the memory 206 after transmission. In further arrangements, the data is deleted from the memory 206 after a confirmation is received from the remote data center 106 that confirms safe receipt of the transmitted data.

If a cellular data connection is not active, a connection with the operator device is established at 308. Upon a determination that the cellular data connection is not active (or is not of a reliable connection strength to transmit the data), the telematics system 116 establishes a data connection with the operator device 120. The data connection with the operator device 120 may be established via Bluetooth, ZigBee, Wi-Fi, or another wireless data connection. In some arrangements, the data connection is established through a wired data connection (e.g., USB, Ethernet, etc.). In some arrangements, the data connection is already established with the operator device 120. For example, at a key-on situation for the internal combustion engine 108, the telematics system 116 may automatically connect with a previously paired operator device 120. In other arrangements, the telematics system 116 may prompt the operator to pair the operator device 120 with the telematics system 116 (e.g., by triggering a warning or a message transmitted to the operator via a display of the vehicle 102).

The data is transmitted to the operator device at 310. The telematics system 116 transmits the data to the operator device 120 through the data connection established (or verified) at 308 via the data transceiver 214. In some arrangements, the data is packaged with instructions that cause the operator device 120 to locally store the received data (e.g., in a memory device of the operator device 120) and to transmit the received data via the network 104 to the remote data center 106 when the operator device 120 establishes a connection to the network 104 (e.g., via cellular data connection, via Wi-Fi, etc.). In some arrangements, the data is deleted from the memory 206 after transmission. In further arrangements, the data is deleted from the memory 206 after a confirmation is received from the remote data center 106 and/or the operator device 120 that confirms safe receipt of the transmitted data. After the remote data center 106 receives the data from both the telematics system 116 and the operator device 120, the remote data center 106 can combine and compile the data into a single data entry or into a single database. The data may be compiled based on time stamps such that time gaps of data received from the telematics system 116 (e.g., when the vehicle is not within range of a cellular network and instead transmits data locally to the operator device 120) can be filled in by data received from the operator device 120.

The above-described systems and methods provide for reliable data transmission between a telematics system 116 of a vehicle 102 and a remote data center 106. In many cases, the vehicle 102 may move to a position in which the telematics system 116 cannot establish or maintain a cellular data connection with the network 104 (e.g., by driving to a remote, unpopulated area not covered by cellular carriers). In this case, the data can be transmitted to the operator device 120 for temporary (or permanent) storage and later transmission to the remote data center 106 via a connection established between the operator device 120 and the network 104. Accordingly, the described systems and methods provide for reliable data transmission with no data loss when the vehicle is out of communication range, which results in less downtime and maintenance cost for the vehicle 102 and a lower cost for the telematics system 116 (e.g., by eliminating the need for a satellite data connection).

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps/processes of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps or processes of a depicted method. Additionally, the order in which a particular method occurs may or may not strictly adhere to the order of the corresponding steps or processes shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Some of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processor 204 of the filter monitoring controller 124. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a computer (such as via the filter monitoring controller 124 of FIG. 1), partly on the computer, as a stand-alone computer-readable package, partly on the computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method of transmitting data comprising:
   receiving, by a telematics system, data from a filtration monitoring system module, the filtration monitoring system module configured to monitor a characteristic of at least one filtration system associated with an internal combustion engine, the data relating to the monitored characteristic;
   determining, by the telematics system, a status of a cellular data connection between the telematics system and a network; and
   transmitting, by the telematics system and based on the determined status of the cellular data connection, the received data either to: (i) a remote data center via the network and the cellular data connection when the telematics system is connected to the network via the cellular data connection, or (ii) to an operator device associated with an operator of the internal combustion engine via a local wireless connection established between the telematics system and the operator device when the telematics system is not connected to the network via the cellular network connection.

2. The method of claim 1, further comprising storing, by the telematics system, the data in a memory device of the telematics system.

3. The method of claim 1, wherein the memory device is a first-in first-out buffer.

4. The method of claim 1, further comprising receiving, by the telematics system, a confirmation message from the remote data center or the operator device that the data was received.

5. The method of claim 4, further comprising deleting, by the telematics system, the data from the memory device.

6. The method of claim 1, wherein the local wireless connection is a Bluetooth connection between the telematics system and the operator device.

7. The method of claim 1, wherein the operator device is a smartphone.

8. The method of claim 1, wherein the internal combustion engine powers an autonomous vehicle.

9. The method of claim 1, wherein the data includes a timestamp that corresponds to a time in which the monitored characteristic was sensed.

10. The telematics system of claim 8, wherein the memory device comprises a first-in first-out buffer.

11. A telematics system comprising:
    a filtration monitoring system input-output circuit structured to send and receive first data to and from a filtration monitoring system module, the filtration monitoring system module structured to monitor a characteristic of a filtration system associated with an internal combustion engine, the first data comprising information relating to the monitored characteristic; and a data transmission circuit structured to:
   determine a status of a cellular data connection to a network as active or not active;
   transmit second data comprising information relating to the monitored characteristic to: (i) a remote data center via the cellular data connection to the network when the status of the cellular data connection to the network is active, or (ii) an operator device associated with an operator of the internal combustion engine via a local wireless connection established between the telematics system and the operator device when the status of the cellular data connection to the network is not active.

12. The telematics system of claim 11, further comprising:
an engine control module (ECM) circuit structured to send and receive data to and from an ECM module, the ECM module structured to provide data relating to an engine operating parameter; and
wherein the second data further comprises the data relating to the engine operating parameter.

13. The telematics system of claim 11, further comprising a data transceiver structured to establish the local wireless connection between the telematics system and the operator device and send the second data comprising information relating to the monitored characteristic to the operator device associated with the operator to the internal combustion engine via the established local wireless connection.

14. The telematics system of claim 11, further comprising a memory device structured to store the first data.

15. The telematics system of any one of claim 11, the data transmission circuit further structured to receive a confirmation message from the remote data center or the operator device that the second data was received.

16. The telematics system of claim 14, further comprising a memory device structured to store the first data and delete the first data from the memory device consequent to receiving the confirmation message from the remote data center or the operator device.

17. The telematics system of claim 15, further comprising a memory device structured to store the first data and delete the first data from the memory device consequent to receiving the confirmation message from the remote data center or the operator device.

18. The telematics system of claim 11, wherein the local wireless connection is a Bluetooth connection between the telematics system and the operator device.

19. The telematics system of claim 11, wherein the second data further comprises a time in which the monitored characteristic was sensed.

20. A method of transmitting data comprising:
receiving, by one of an engine control module or filtration monitoring system, data from a filtration monitoring system module, the filtration monitoring system module configured to monitor a characteristic of at least one filtration system associated with an internal combustion engine, the data relating to the monitored characteristic;
determining, by the telematics system, a status of a cellular data connection between the telematics system and a network is inactive;
transmitting data comprising the inactive status of the cellular data connection to the one of the engine control module or filtration monitoring system by the telematics system; and
transmitting, by the one of the engine control module or filtration monitoring system, the received data, to: (i) an operator device associated with an operator of the internal combustion engine via a local wireless connection established between the one of the engine control module or filtration monitoring system and the operator device when the cellular data connection is inactive; or (ii) a remote data center via a network and the cellular data connection when the cellular data connection is active.

* * * * *